US012721349B2

(12) United States Patent
Kato et al.

(10) Patent No.: US 12,721,349 B2
(45) Date of Patent: Sep. 1, 2026

(54) METHOD FOR PROMOTING BACTERIAL CELL WALL DEGRADATION

(71) Applicant: KABUSHIKI KAISHA YAKULT HONSHA, Minato-ku (JP)

(72) Inventors: Kosuke Kato, Minato-ku (JP); Takekazu Okumura, Minato-ku (JP); Akira Kushiro, Minato-ku (JP)

(73) Assignee: KABUSHIKI KAISHA YAKULT HONSHA, Minato-ku (JP)

( * ) Notice: Subject to any disclaimer, the term of this patent is extended or adjusted under 35 U.S.C. 154(b) by 629 days.

(21) Appl. No.: 17/438,101

(22) PCT Filed: Mar. 23, 2020

(86) PCT No.: PCT/JP2020/012638
§ 371 (c)(1),
(2) Date: Sep. 10, 2021

(87) PCT Pub. No.: WO2020/196374
PCT Pub. Date: Oct. 1, 2020

(65) Prior Publication Data

US 2022/0248687 A1 Aug. 11, 2022

(30) Foreign Application Priority Data

Mar. 25, 2019 (JP) ................................ 2019-056337

(51) Int. Cl.
*A01N 63/50* (2020.01)
*A01N 43/16* (2006.01)
*A01P 1/00* (2006.01)

(52) U.S. Cl.
CPC ............. *A01N 63/50* (2020.01); *A01N 43/16* (2013.01); *A01P 1/00* (2021.08)

(58) Field of Classification Search
CPC ............ A01N 63/50; A01N 43/16; A01P 1/00
See application file for complete search history.

(56) References Cited

FOREIGN PATENT DOCUMENTS

| | | | | |
|---|---|---|---|---|
| CN | 1863811 | A | | 11/2006 |
| JP | 59-88086 | A | | 5/1984 |
| JP | 60-30678 | A | | 2/1985 |
| JP | S 62208275 | A | * | 3/1986 |
| JP | 62-208275 | A | | 9/1987 |
| JP | 64-71 489 | A | | 3/1989 |

OTHER PUBLICATIONS

Nitta, Sakiko, Yoshihiro Furukawa, and Takeshi Kakegawa. "Effects of silicate, phosphate, and calcium on the stability of aldopentoses." Origins of Life and Evolution of Biospheres 46 (2016): 189-202. (Year: 2016).*
Sasaki machine translation (Year: 2023).*
"Protoplasts" Retrieved from https://en.wikipedia.org/wiki/Protoplast on Mar. 13, 2024. (Year: 2024).*
Brönneke, Volker, and Franz Fiedler. "Production of bacteriolytic enzymes by Streptomyces globisporus regulated by exogenous bacterial cell walls." Applied and environmental microbiology 60.3 (1994): 785-791. (Year: 1994).*
Scolari, G., and M. Vescovo. "Peptidase localization in Lactobacillus casei 5 Mn373 by stable protoplasts formation." Biotechnology techniques 10.9 (1996): 687-692. (Year: 1996).*
Stachyose (retrieved from https://www.sciencedirect.com/topics/agricultural-and-biological-sciences/stachyose#:~:text=Stachyose%20is%20a%20type%20of,(1%E2%86%942)%20%CE%B2Fruf on Aug. 19, 2024). (Year: 2024).*
Rahim, A., Peters, G. H. J., Jalkanen, K. J., & Westh, P. (2013). Effects of mannose, fructose, and fucose on the structure, stability, and hydration of lysozyme in aqueous solution. Current Physical Chemistry, 3(1), 113-125. (Year: 2013).*
Kobayashi, Osamu, et al. "Bactericidal actions of hen egg white lysozyme and mutanolysin against lactic acid bacteria." Biocontrol Science 2.1 (1997): 31-34. (Year: 1997).*
Salazar, Oriana, and Juan A. Asenjo. "Enzymatic lysis of microbial cells." Biotechnology letters 29 (2007): 985-994. (Year: 2007).*
International Search Report issued on Apr. 14, 2020 in PCT/JP2020/012638 filed on Mar. 23, 2020, 2 pages.
Kobayashi et al., "Bactericidal and Bacteriostatic Action of Hen Egg White Lysozyme and Mutanolysin against Lactic Acid Bacteria", Science and Industry, 2001, vol. 75, No. 3, pp. 117-122 (7 total pages; with English Abstract).
Combined Chinese Office Action and Search Report issued Jun. 12, 2024 in Chinese Patent Application No. 202080024025.9 (with unedited computer-generated English translation), 11 pages.
Rosario Vanella et al., Understanding activity-stability tradeoffs in biocatalysts by enzyme proximity sequencing, nature communications, (2024)15:1807Published online: Feb. 28, 2024, 14 pages.
Kanae Yokogawa et al., Mutanolysin, Bacteriolytic Agent for Cariogenic Streptococci: Partial Purification and Properties, Antimicrobial Agents and Chemotherapy, Aug. 1974, p. 156-165, vol. 6, No. 2 (10 pages).
Matsue et al., Influence of water activity and aqueous solvent ordering on enzyme kinetics of alcohol dehydrogenase, lysozyme, and β-galactosidase, Enzyme and Microbial Technology 26 (2000) 342-347 (6 pages).

* cited by examiner

*Primary Examiner* — Robert J Yamasaki
*Assistant Examiner* — Trevor Kane
(74) *Attorney, Agent, or Firm* — Oblon, McClelland, Maier & Neustadt, L.L.P.

(57) ABSTRACT

Provided is a method for promoting bacterial cell wall degradation. A method for promoting cell wall degradation, comprising allowing an N-acetylmuramidase to act on a bacterium in the presence of one or more saccharides selected from the group consisting of: a monosaccharide wherein the monosaccharide is an aldopentose, an L-aldohexose, or a ketohexose; a disaccharide, an oligosaccharide, and a polysaccharide each containing one or more of the monosaccharides as a constituent saccharide; and a derivative thereof.

5 Claims, 7 Drawing Sheets

METHOD FOR PROMOTING BACTERIAL CELL WALL DEGRADATION

TECHNICAL FIELD

The present invention relates to a method for promoting bacterial cell wall degradation.

BACKGROUND ART

The bacterial cell wall maintains the cell structure and protects the cell from turgor pressure due to the fact that the cell contains many molecules such as proteins. In addition, the cell wall is located in the outermost layer of the cell and therefore plays a role of regulating the interaction between the cell and the external environment. Accordingly, understanding the composition, structure, and function of the cell wall is important for elucidating the properties of bacteria and trying to utilize the bacteria.

The cell wall of Gram-negative bacteria is composed of a peptidoglycan layer and an outer membrane on the outer side thereof, whereas the cell wall of Gram-positive bacteria is composed of a thick peptidoglycan layer and is modified with teichoic acid and glycan. The peptidoglycan has a sugar chain composed of repetition of N-acetylmuramic acid and N-acetylglucosamine as a basic skeleton and forms a strong network structure through binding of a peptide consisting of several amino acids to the carboxyl group of muramic acid and crosslinking of the peptides to each other.

Enzymes known to degrade the bacterial cell wall include, for example, an N-acetylmuramidase (systematic name: peptidoglycan N-acetylmuramoylhydrolase). The N-acetylmuramidase is an enzyme for hydrolysis of the β-1,4-glycosidic bond between N-acetylmuramic acid and N-acetylglucosamine constituting peptidoglycan, and is utilized in, for example, extraction of nucleic acids, studies of cell wall structure or cell wall components, and preparation of protoplasts. In addition, it has been reported that allowing lysozyme, one of N-acetylmuramidases, and mutanolysin, another N-acetylmuramidase, to act on lactic acid bacteria provides a synergistic bactericidal effect (Non-Patent Literature 1).

CITATION LIST

Non-Patent Literature

Non-Patent Literature 1: KOBAYASHI, Osamu, et al., Science and industry, 75(3), 117-122, 2001

SUMMARY OF INVENTION

Technical Problem

However, it was revealed that even if lysozyme and mutanolysin are used in combination, the bacterial cell wall peptidoglycan is not sufficiently degraded in some cases. Accordingly, it is an object of the present invention to provide a method which can simply and efficiently degrade the bacterial cell wall.

Solution to Problem

Accordingly, the present inventors have conducted an extensive study to search for substances that promote the degradation reaction in bacterial cell wall degradation by an N-acetylmuramidase, and found that when the cell wall degradation reaction is performed in the presence of an aldopentose, an L-aldohexose, or a ketohexose, the cell wall degradation rate is improved and/or the initial cell wall degradation speed is improved, thereby completing the present invention.

The present invention provides the following [1] to [12].

[1] A method for promoting cell wall degradation, comprising allowing an N-acetylmuramidase to act on a bacterium in the presence of one or more saccharides selected from the group consisting of:
- a monosaccharide wherein the monosaccharide is an aldopentose, an L-aldohexose, or a ketohexose;
- a disaccharide, an oligosaccharide, and a polysaccharide each containing one or more of the monosaccharides as a constituent saccharide; and
- a derivative thereof.

[2] The method for promoting cell wall degradation according to [1], wherein the saccharide is one or more selected from the group consisting of D-arabinose, L-arabinose, D-lyxose, L-lyxose, D-xylose, L-xylose, D-ribose, L-ribose, L-fucose, L-mannose, L-rhamnose, and D-fructose.

[3] The method for promoting cell wall degradation according to [1] or [2], wherein the N-acetylmuramidase is derived from *Streptomyces globisporus.*

[4] The method for promoting cell wall degradation according to any one of [1] to [3], wherein the N-acetylmuramidase is mutanolysin.

[5] The method for promoting cell wall degradation according to any one of [1] to [4], wherein the bacterium is a Gram-positive bacterium.

[6] The method for promoting cell wall degradation according to any one of [1] to [5], wherein the bacterium is a bacterium belonging to the genus *Lactobacillus.*

[7] An agent for promoting bacterial cell wall degradation, comprising, as an active ingredient, one or more saccharides selected from the group consisting of:
- a monosaccharide wherein the monosaccharide is an aldopentose, an L-aldohexose, or a ketohexose;
- a disaccharide, an oligosaccharide, and a polysaccharide each containing one or more of the monosaccharides as a constituent saccharide; and
- a derivative thereof.

[8] The agent for promoting cell wall degradation according to [7], wherein the saccharide is one or more selected from the group consisting of D-arabinose, L-arabinose, D-lyxose, L-lyxose, D-xylose, L-xylose, D-ribose, L-ribose, L-fucose, L-mannose, L-rhamnose, and D-fructose.

[9] A kit for promoting bacterial cell wall degradation, comprising one or more saccharides selected from the group consisting of:
- a monosaccharide wherein the monosaccharide is an aldopentose, an L-aldohexose, or a ketohexose;
- a disaccharide, an oligosaccharide, and a polysaccharide each containing one or more of the monosaccharides as a constituent saccharide; and
- a derivative thereof, and an N-acetylmuramidase.

[10] The kit for promoting cell wall degradation according to [9], wherein the saccharide is one or more selected from the group consisting of D-arabinose, L-arabinose, D-lyxose, L-lyxose, D-xylose, L-xylose, D-ribose, L-ribose, L-fucose, L-mannose, L-rhamnose, and D-fructose.

[11] Use of one or more saccharides selected from the group consisting of:

a monosaccharide wherein the monosaccharide is an aldopentose, an L-aldohexose, or a ketohexose;

a disaccharide, an oligosaccharide, and a polysaccharide each containing one or more of the monosaccharides as a constituent saccharide; and a derivative thereof, for manufacturing an agent for promoting cell wall degradation.

[12] The use according to [11], wherein the saccharide is one or more selected from the group consisting of D-arabinose, L-arabinose, D-lyxose, L-lyxose, D-xylose, L-xylose, D-ribose, L-ribose, L-fucose, L-mannose, L-rhamnose, and D-fructose.

Effects of Invention

According to the present invention, in bacterial cell wall degradation using an N-acetylmuramidase, the bacterial cell wall degradation rate can be improved and/or the initial cell wall degradation speed can be improved by a simple method of performing the degradation in the presence of a specific saccharide. Consequently, a cell wall degradation product can be obtained with a high yield and a high purity, and it is possible to contribute to elucidation of the composition, structure, and function of the bacterial cell wall, cell membrane, or cytoplasm.

DESCRIPTION OF EMBODIMENTS

Figure 1:
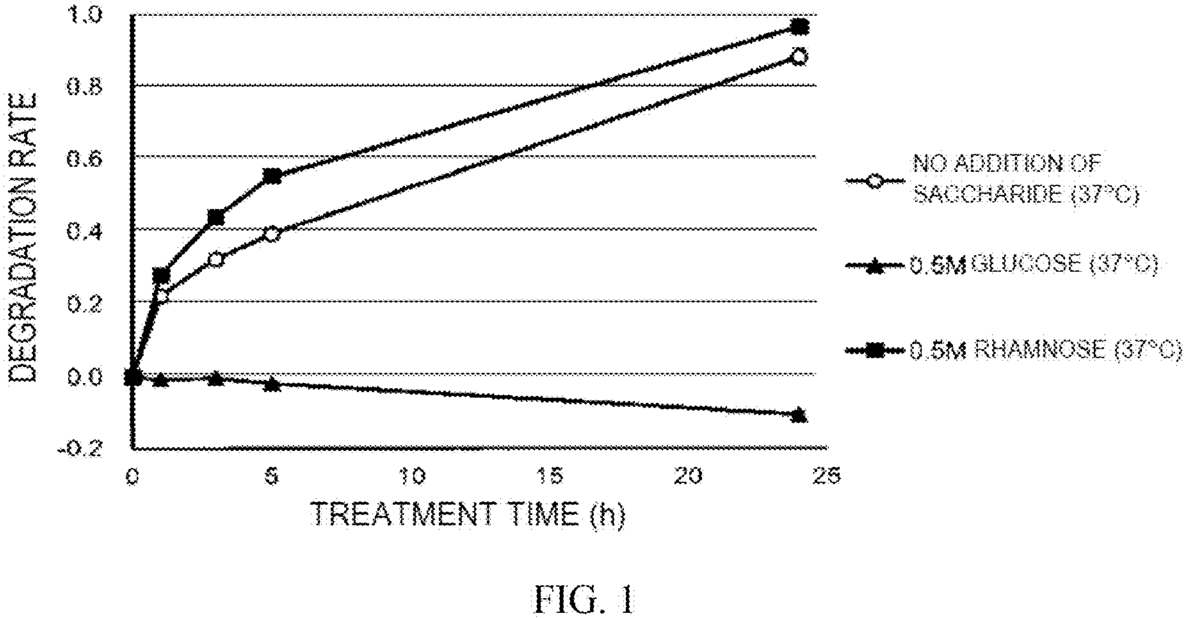
FIG. 1 is a graph showing the effect of addition of D-glucose or L-rhamnose in cell wall degradation reaction by an N-acetylmuramidase.

The method for promoting bacterial cell wall degradation of the present invention comprises allowing an N-acetylmuramidase to act on bacteria in the presence of one or more saccharides selected from the group consisting of: a monosaccharide wherein the monosaccharide is an aldopentose, an L-aldohexose, or a ketohexose; a disaccharide, an oligosaccharide, and a polysaccharide each containing one or more of the monosaccharides as a constituent saccharide; and a derivative thereof. Promotion of cell wall degradation in the present invention means improvement in cell wall degradation rate and/or improvement in initial cell wall degradation speed.

In the present invention, a bacterium as a target for cell wall degradation is not particularly limited, and examples thereof include Gram-positive bacteria, such as lactic acid bacteria, *Bifidobacterium*, and *Clostridium*; and Gram-negative bacteria, such as *Escherichia coli* and *Bacteroides*. Among these bacteria, preferred are Gram-positive bacteria having thick peptidoglycan layers, more preferred are lactic acid bacteria and *Bifidobacterium*, and particularly preferred are lactic acid bacteria. As the lactic acid bacteria, lactic acid bacteria belonging to the genus *Lactobacillus, Streptococcus, Lactococcus, Leuconostoc*, or *Pediococcus* are preferable. Specific examples thereof include *Lactobacillus casei, Lactobacillus acidophilus, Lactobacillus salivarius, Lactobacillus gasseri, Lactobacillus fermentum, Lactobacillus helveticus, Lactobacillus jugurti, Lactobacillus delbrueckii* subsp. *bulgaricus, Streptococcus thermophilus, Lactococcus lactis* subsp. *lactis, Lactococcus lactis* subsp. *cremoris, Leuconostoc mesenteroides*, and *Pediococcus pentosaceus*, and *Lactobacillus casei* is particularly preferred. As *Lactobacillus casei, Lactobacillus casei* YIT 9029 (FERM BP-1366) is preferable.

The method for preparing the bacteria is not particularly limited and may be performed according to a conventional process. For example, an inoculum of the bacteria is inoculated in a growth medium and is cultured, and after the culture, the bacteria can be prepared by a method for isolating and purifying bacterial cells, such as centrifugation or filtration. Examples of the medium include, but not limited to, a synthetic medium in which individual components are mixed, such as MRS, and a medium using a milk component such as milk or skim milk powder. The thus-prepared bacterial cells may be directly subjected to cell wall degradation reaction. Alternatively, the bacterial cells may be suspended in a buffer solution which shows a buffering capacity around pH 7.0, such as Tris-maleate buffer, Tris-HCl buffer, phosphate buffer, or HEPES buffer, and the suspension may be used for cell wall degradation reaction.

Although the enzyme to be used for degradation of the bacterial cell wall in the present invention is not particularly limited as long as it is an N-acetylmuramidase, an N-acetylmuramidase derived from *Streptomyces globisporus* is preferable. Here, the "N-acetylmuramidase derived from *Streptomyces globisporus*" may be a wild-type N-acetylmuramidase produced by *Streptomyces globisporus*, or may be an enzyme that is obtained by expressing a gene encoding the N-acetylmuramidase in *Escherichia coli* or the like or an enzyme that is obtained by modifying the gene by recombinant DNA technology and expressing the modified gene and retains an N-acetylmuramidase activity. Examples of the N-acetylmuramidase include N-acetylmuramidase M1, N-acetylmuramidase M2, and a mixture including at least N-acetylmuramidase M1 and N-acetylmuramidase M2, and a typical example thereof is mutanolysin. Alternatively, a commercial product can also be used as the N-acetylmuramidase, and examples thereof include mutanolysin from *Streptomyces globisporus* ATCC 21553 (manufactured by Sigma-Aldrich Co.) and mutanolysin (recombinant) (manufactured by A&A Biotechnology). The form of the N-acetylmuramidase is not particularly limited. For example, dried enzyme protein, particles containing enzyme protein, or a liquid containing enzyme protein can be used. In the method for promoting cell wall degradation of the present invention, the N-acetylmuramidases may be used alone or in combination of two or more thereof or may be used in combination with another cell wall degradation enzyme.

The amount of the N-acetylmuramidase to be used may be appropriately set considering, for example, the amount of the bacteria to be used and the size of the reaction system, and is, for example, preferably from 1 to 1,000 U, more preferably from 10 to 500 U, and even more preferably from 50 to 300 U. Here, 1 U refers to an amount of an enzyme causing ΔA600 nm of 0.01 in one minute in a reaction using a suspension of the cell wall of *Streptococcus faecalis* as a substrate under reaction conditions of pH 6.0, 37° C., and 1 mL.

The saccharide to be used in the present invention is one or more saccharides selected from the group consisting of: a monosaccharide wherein the monosaccharide is an aldopentose, an L-aldohexose, or a ketohexose; a disaccharide, an oligosaccharide, and a polysaccharide each containing one or more of the monosaccharides as a constituent saccharide; and a derivative thereof. Here, the disaccharide refers to a molecule formed from two monosaccharides bonded through a glycosidic bond; the oligosaccharide refers to a molecule formed from about one to ten monosaccharides bonded through glycosidic bonds; and the polysaccharide refers to a molecule formed from a large number of monosaccharides bonded through glycosidic bonds. Examples of the derivative of a saccharide include, but not limited to, a deoxy sugar in which a hydroxy group of a saccharide is substituted with a hydrogen atom, a uronic acid in which a hydroxymethyl group of a saccharide is substituted with a carboxyl group, an amino sugar in which a hydroxy group of a saccharide is substituted with an amino group, and a sugar alcohol in which a carbonyl group of a saccharide is reduced to an alcohol. The saccharide may be a natural product or a synthetic product.

The aldopentose is a monosaccharide having 5 carbon atoms and having an aldehyde group at the 1-position. The aldopentose may be either the D-form or the L-form, and examples thereof include D-arabinose, L-arabinose, D-lyxose, L-lyxose, D-xylose, L-xylose, D-ribose, and L-ribose. Examples of the derivative of aldopentose include D-deoxyribose, D-arabinitol, xylitol, and ribitol. Examples of the disaccharide, oligosaccharide, and polysaccharide include xylobiose, primeverose, vicianose, xyloglucan, arabinan, arabinoxylan, and rhamnogalacturonan-I. Among them, from the viewpoint of the cell wall degradation-promoting effect, D-arabinose, L-arabinose, D-lyxose, L-lyxose, L-xylose, D-ribose, and L-ribose are preferable.

The L-aldohexose is a monosaccharide having 6 carbon atoms, having an aldehyde group at the 1-position and being an L-form. Specifically, examples thereof include L-mannose, L-allose, L-altrose, L-glucose, L-gulose, L-idose, L-galactose, and L-talose. Examples of the derivative of L-aldohexose include L-fucose, L-rhamnose, L-talomethylose, colitose, iduronic acid, and L-mannitol. Examples of the disaccharide, oligosaccharide, and polysaccharide include scillabiose, neohesperidose, rutinose, rutinulose, fucoidan, rhamnogalacturonan, and rhamnogalacturonan-II. Among them, from the viewpoint of the cell wall degradation-promoting effect, L-fucose, L-mannose, and L-rhamnose are preferable.

The ketohexose is a monosaccharide having 6 carbon atoms and having a ketone group at the 2-position. The ketohexose may be either the D-form or the L-form, and examples thereof include D-fructose, L-fructose, D-psicose, L-psicose, D-sorbose, L-sorbose, D-tagatose, and L-tagatose. Among them, from the viewpoint of the cell wall degradation-promoting effect, D-fructose is preferable.

Among the saccharides, from the viewpoint of the cell wall degradation-promoting effect, preferred are an aldopentose, an L-aldohexose, a ketohexose, and a derivative thereof, and more preferred are an aldopentose, an L-aldohexose, and a derivative thereof. Specifically, preferred are D-arabinose, L-arabinose, D-lyxose, L-lyxose, D-xylose, L-xylose, D-ribose, L-ribose, L-fucose, L-mannose, L-rhamnose, and D-fructose, more preferred are D-arabinose, L-arabinose, D-lyxose, L-lyxose, L-xylose, D-ribose, L-ribose, L-fucose, L-mannose, and L-rhamnose, and even more preferred are D-arabinose, L-arabinose, D-lyxose, L-lyxose, L-xylose, D-ribose, L-ribose, and L-fucose. From the viewpoint of being inexpensive, D-arabinose, L-arabinose, D-lyxose, L-lyxose, L-xylose, and L-fucose are particularly preferable. These saccharides may be used alone or in combination of two or more thereof.

The amount of the saccharide to be used may be appropriately set considering, for example, the amount of the bacteria to be used and the size of the reaction system, and is, for example, preferably from 0.01 to 3 M, more preferably from 0.05 to 2 M, even more preferably from 0.1 to 1.5 M, and particularly preferably from 0.5 to 1.5 M, from the viewpoint of the cell wall degradation-promoting effect and the solubility of the saccharide.

The saccharide is useful as an agent for promoting bacterial cell wall degradation. The saccharide may be used as is as an agent for promoting bacterial cell wall degradation or may be used as a material for manufacturing an agent for promoting bacterial cell wall degradation. The agent for promoting bacterial cell wall degradation of the present invention may contain a solvent in addition to the saccharide, and examples of the solvent include an aqueous medium. Examples of the aqueous medium include not only water but also various buffer solutions, such as phosphate buffer, glycine buffer, Good's buffer, Tris buffer, and ammonia buffer, and the agent may contain one or more of these media. The agent for promoting bacterial cell wall degradation of the present invention has good solubility in the solvent and is easy to handle. In addition, the agent for promoting bacterial cell wall degradation of the present invention may contain, for example, a pH buffer and a surfactant, in addition to the saccharide and the solvent.

In order to implement the method for promoting bacterial cell wall degradation of the present invention, an N-acetylmuramidase may be allowed to act on bacteria in the presence of the saccharide. The order of addition of the saccharide is not particularly limited. For example, a saccharide may be added to a bacterial suspension, and then an N-acetylmuramidase may be added to perform cell wall degradation reaction, or an N-acetylmuramidase may be added to a bacterial suspension, and then a saccharide may be added to perform cell wall degradation reaction.

The reaction temperature for the cell wall degradation reaction may be any temperature that can maintain the activity of the N-acetylmuramidase and is preferably from 30° C. to 60° C., more preferably from 35° C. to 55° C., and even more preferably from 37° C. to 50° C. from the viewpoint of the enzyme activity. The reaction time varies depending on, for example, the type of the bacterium to be used, but is preferably from 10 minutes to 48 hours and more preferably from 30 minutes to 24 hours from the viewpoint of degradation rate. The pH is preferably from 5.5 to 8.0 and more preferably from 6.0 to 7.0.

The degree of progress in degradation of the cell wall can be evaluated by, for example, measuring the turbidity ($OD_{615}$) of a bacterial suspension before and after reaction with a spectrophotometer, and calculating the degradation rate by the following equation (1):

$$\text{Degradation rate}=1-(OD_{615}\text{ after reaction}/OD_{615}\text{ before reaction}) \quad (1).$$

An improvement in the cell wall degradation rate in the present invention means, for example, that the cell wall degradation rate calculated by the equation above is improved compared with that in the absence of the saccharide. An improvement in the initial cell wall degradation speed in the present invention means that the cell wall degradation speed from the start of the action of an N-acetylmuramidase to 5 hours, preferably 2 hours, and more preferably 1 hour after the start is improved compared with that in the absence of the saccharide.

In order to implement the method for promoting bacterial cell wall degradation of the present invention, it is preferable to use a kit for promoting bacterial cell wall degradation comprising one or more saccharides selected from the group consisting of: a monosaccharide wherein the monosaccharide is an aldopentose, an L-aldohexose, or a ketohexose; a disaccharide, an oligosaccharide, and a polysaccharide each containing one or more of the monosaccharides as a constituent saccharide; and a derivative thereof and comprising an N-acetylmuramidase. The kit may contain, for example, a buffer solution and instructions for procedures of the method as needed.

According to the method for promoting bacterial cell wall degradation of the present invention, as shown in Examples below, cell wall degradation reaction can be promoted by allowing an N-acetylmuramidase to act on bacteria in the presence of the saccharide. After the completion of the cell wall degradation reaction, as needed, the degradation product can be collected with a high yield from the reaction solution by an appropriate combination of conventional methods such as enzyme treatment, dialysis, and chromatography. The methods are not particularly limited. For example, the reaction solution may be subjected to protease treatment then to nuclease treatment and may be then dialyzed.

EXAMPLES

The present invention will now be described in further detail with reference to Examples, but the present invention is not limited thereto.

Example 1: Bacterial Cell Wall Degradation 1

(1) Bacterial Strain Under Test

*Lactobacillus casei* YIT 9029 (hereinafter, referred to as YIT 9029) was used.

(2) Preparation of Culture Medium

Difco Lactobacilli MRS Broth (manufactured by Becton, Dickinson and Company) was prepared by the method indicated by the manufacturer, and 30 mL of the broth was dispensed in a 50-mL polypropylene centrifuge tube (manufactured by Eppendorf North America, Inc.).

(3) Preparation of Bacterial Solution

Thirty microliters of the pre-cultured bacterial solution of about $2\times10^9$ CFU/mL cultured in the MRS Broth was inoculated in 30 mL of the MRS Broth prepared in the above (2) and then cultured at 37° C. for 24 hours.

(4) Degradation of Cell Wall

A bacterial solution containing 2 to $3\times10^9$ CFU/mL of YIT 9029 was centrifugated (5,000×g, 15 minutes), and the precipitate was washed with sterilized water of the same volume as that of the original bacterial solution three times. The bacteria were suspended in a 5 mM Tris-maleate buffer solution (manufactured by Sigma-Aldrich Co.) (pH 6.4) of the same volume as that of the original bacterial solution, and 100 μg of lysozyme from chicken egg white lyophilized powder (manufactured by Sigma-Aldrich Co., hereinafter, referred to as lysozyme), which is egg white lysozyme, and 100 U of mutanolysin (recombinant) (manufactured by A&A Biotechnology) were added per 1 mL of the suspension. The reaction solution was treated at 37° C. for 24 hours. In addition, in order to examine the influence of the addition of a saccharide on cell wall degradation reaction, the same reaction was performed using a Tris-maleate buffer solution containing D-glucose or L-rhamnose at a final concentration of 0.5 M instead of the Tris-maleate buffer solution. Each reaction was performed in triplicate.

(5) Measurement of Degradation Rate

The turbidity ($OD_{615}$) of the bacterial suspension at 615 nm (maximal absorption wavelength; measurement wavelength range: 575-660 nm) was measured over time using a spectrophotometer PiCOSCOPE PAS-110 (manufactured by Ushio Inc.), and the degradation rate was calculated by the following equation (1). The degradation rate was shown by the mean±standard deviation of triplicate.

$$\text{Degradation rate}=1-(OD_{615}\text{ after reaction}/OD_{615}\text{ before reaction}) \quad (1).$$

(6) Result

As shown in FIG. 1, a decrease in cell wall degradation rate was observed when D-glucose was added, compared with the reaction in which no saccharide was added. In contrast, an increase in cell wall degradation rate was observed when L-rhamnose was added.

Example 2: Bacterial Cell Wall Degradation 2

The same reaction as in Example 1 was performed except that L-rhamnose was added at a final concentration of 0 (no addition of saccharide), 0.5, 1.0, or 1.5 M and the reaction temperature was set to 37° C. or 50° C., and the effect of L-rhamnose on the cell wall degradation reaction was examined. Each reaction was performed in triplicate.

Figure 2A:
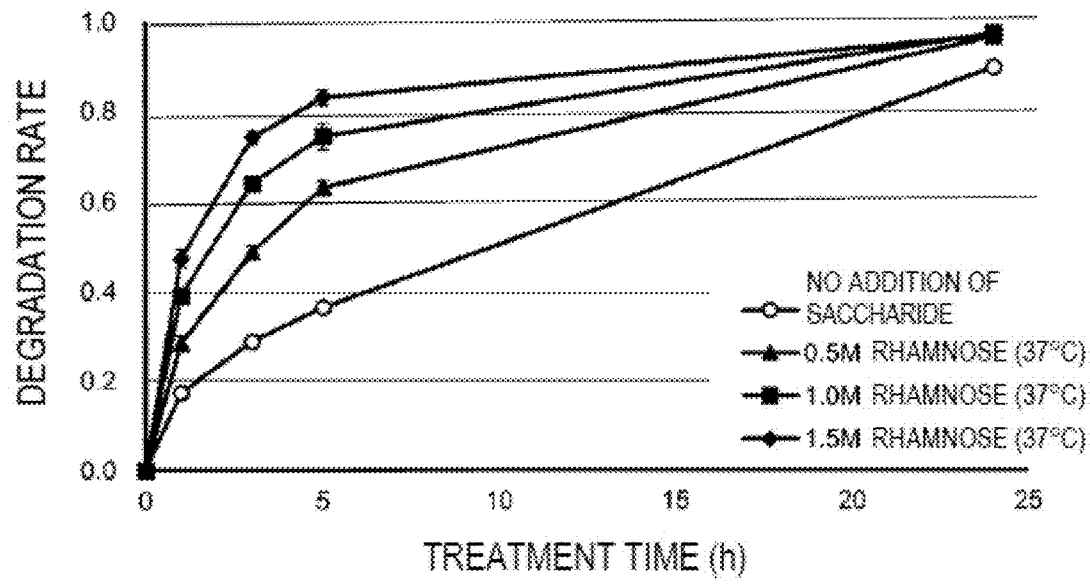
FIG. 2 is graphs showing the effect of addition of L-rhamnose in cell wall degradation reaction by an N-acetylmuramidase (A: reaction temperature of 37° C., B: reaction temperature of 50° C.)
Figure 2B:
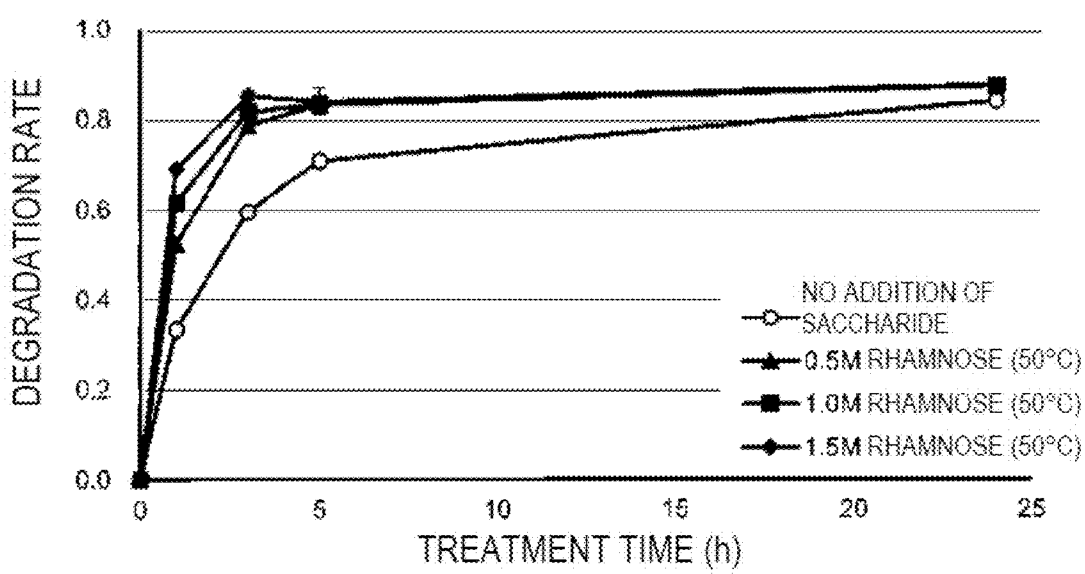

As a result, as shown in FIG. 2, the degradation rate was increased with increasing concentrations of L-rhamnose regardless of the reaction temperature. When the reaction temperature was 37° C., the degradation rate after 5 hours of the reaction was 0.36 when no L-rhamnose was added and was 0.83 when 1.5 M of L-rhamnose was added. When the reaction temperature was 50° C., the degradation rate after 1 hour of the reaction was 0.33 when no L-rhamnose was added and was 0.69 when 1.5 M of L-rhamnose was added. When 1.5 M of L-rhamnose was added, the degradation rate after 24 hours of the reaction was 0.97 when the reaction temperature was 37° C. and was 0.87 when the reaction temperature was 50° C.

Example 3: Bacterial Cell Wall Degradation 3

The same reaction as in Example 1 was performed except that L-rhamnose was added at a final concentration of 1.5 M, 100 U of mutanolysin from *Streptomyces globisporus* ATCC 21553 (manufactured by Sigma-Aldrich Co.) or 100 U of mutanolysin (recombinant) (manufactured by A&A Biotechnology) was used as the N-acetylmuramidase, and the reaction temperature was set to 37° C. or 50° C., and the effect of L-rhamnose on the cell wall degradation reaction was examined. Each reaction was performed without replicates.

Figure 3A:
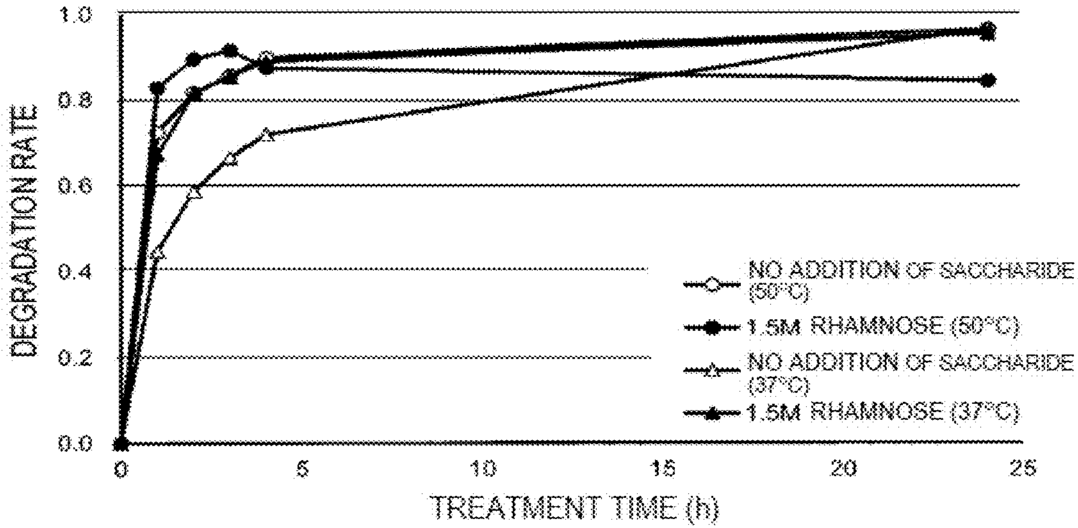
FIG. 3 is graphs showing the effect of addition of L-rhamnose in cell wall degradation reaction by an N-acetylmuramidase (A: Mutanolysin from Streptomyces globisporus ATCC 21553, B: Mutanolysin (recombinant)).
Figure 3B:
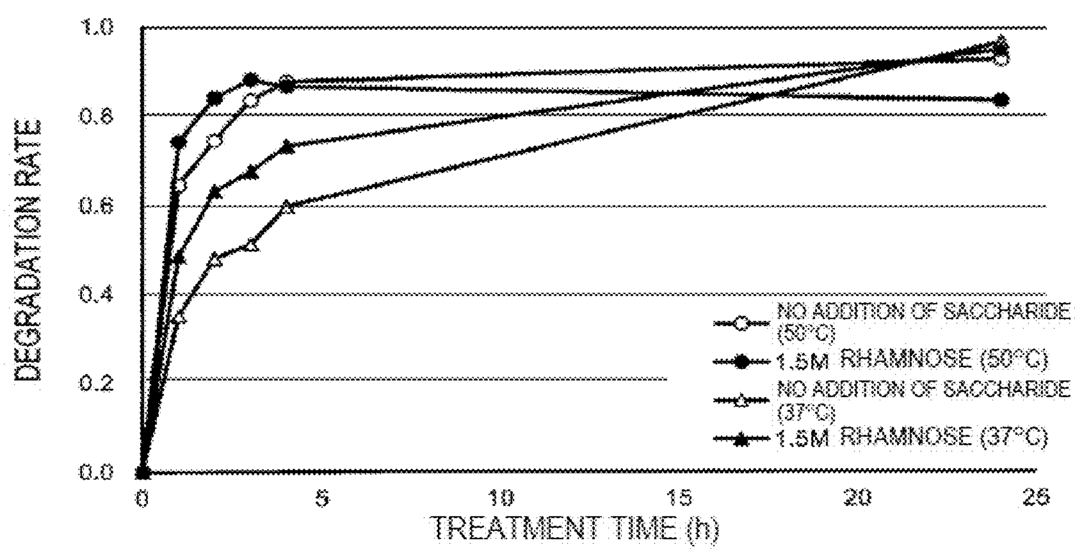

As a result, as shown in FIG. 3, regardless of the reaction temperature and the type of N-acetylmuramidase derived from *Streptomyces globisporus*, an increase in cell wall degradation rate was observed when L-rhamnose was added, compared with the reaction in which no saccharide was added. Accordingly, it was suggested that L-rhamnose promotes cell wall degradation regardless of the type of N-acetylmuramidase derived from *Streptomyces globisporus*.

Example 4: Bacterial Cell Wall Degradation 4

The same reaction as in Example 1 was performed except that D-arabinose, L-arabinose, D-lyxose, L-lyxose, D-xylose, L-xylose, D-ribose, L-ribose, D-fucose, L-fucose, D-mannose, L-mannose, D-galactose, or D-fructose was added as the saccharide, and the cell wall degradation-promoting effect of each saccharide was examined. Each reaction was performed in triplicate.

Figure 4A:
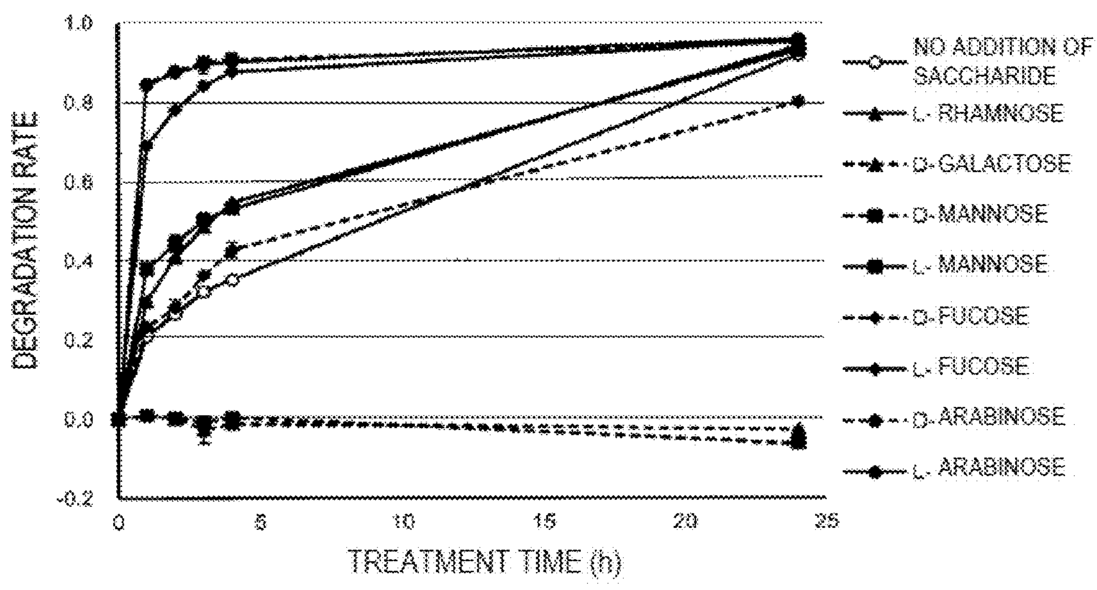
FIG. 4 is graphs showing the effect of addition of various saccharides in cell wall degradation reaction by an N-acetylmuramidase.
Figure 4B:
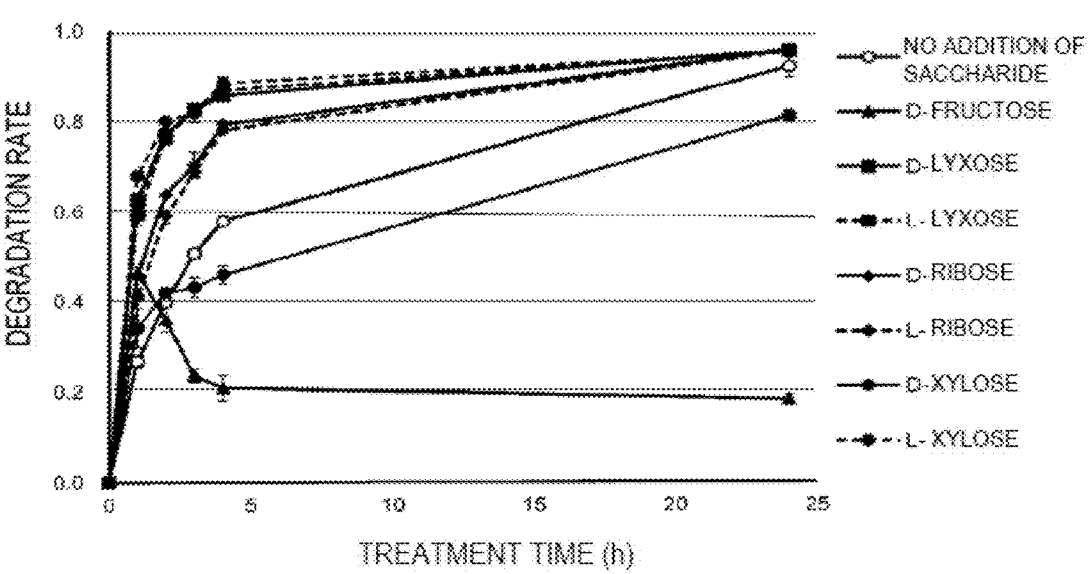

As a result, as shown in FIG. 4, D-arabinose, L-arabinose, D-lyxose, L-lyxose, L-xylose, D-ribose, L-ribose, L-fucose, and L-mannose showed the cell wall degradation-promoting effect. In addition, D-xylose and D-fructose showed the cell wall degradation-promoting effect after 1 hour of the reaction. In particular, when L-fucose was added, the degradation rate after 1 hour of the reaction was about 3 times higher than that of the reaction in which no saccharide was added, and when D-arabinose or L-arabinose was added, the degradation rate after 1 hour of the reaction was about 4 times higher than that of the reaction in which no saccharide was added.

Example 5: Verification of Effect of Addition of Saccharide 1

It was expected from Examples 1 to 4 that a saccharide such as D-arabinose increases the activity of mutanolysin to promote the degradation of cell wall. However, since a possibility that the saccharide increases the activity of lysozyme that has been added together cannot be excluded, the degradation rate when YIT 9029 was treated with mutanolysin or lysozyme alone was examined using some saccharides. Specifically, the same reaction as in Example 1 was performed except that D-arabinose was added as the saccharide at a final concentration of 1.5 M and mutanolysin (recombinant) (manufactured by A&A Biotechnology) alone, lysozyme alone, or a combination of mutanolysin (recombinant) and lysozyme was used. Each reaction was performed without replicates. In addition, the same reaction as in Example 1 was performed except that L-rhamnose, L-mannose, L-fucose, or L-arabinose was added as the saccharide at a final concentration of 0.5, 1.0, or 1.5 M and mutanolysin (recombinant) (manufactured by A&A Biotechnology) was used alone. Each reaction was performed in triplicate.

Figure 5A:
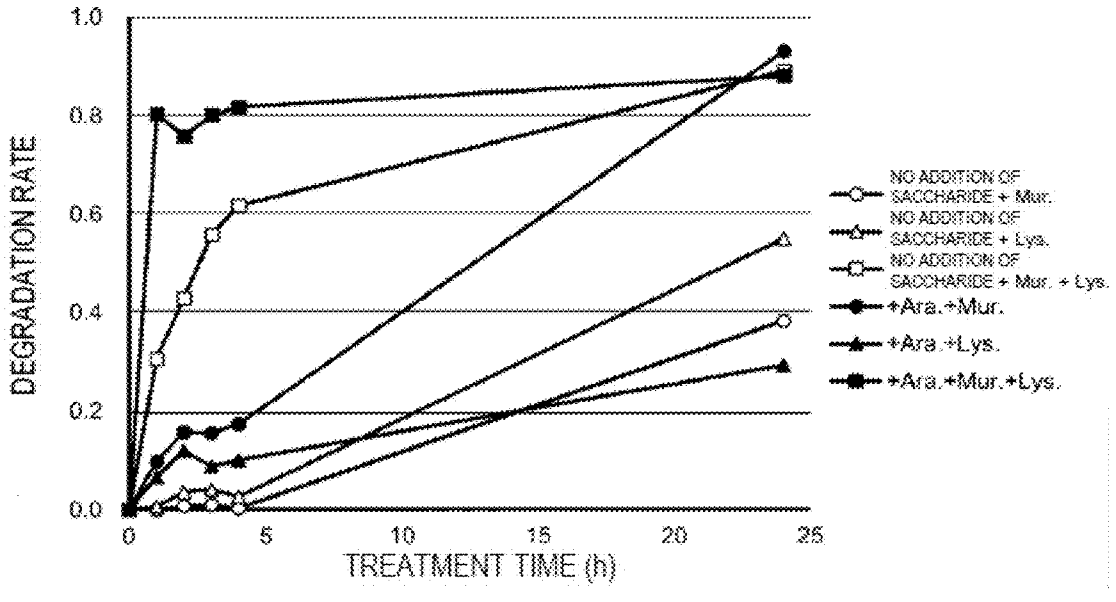
FIG. 5 is graphs showing the effect of addition of various saccharides in cell wall degradation reaction by an N-acetylmuramidase (A: effect of D-arabinose on various enzymes, B: effect of various saccharides on mutanolysin alone).
Figure 5B:
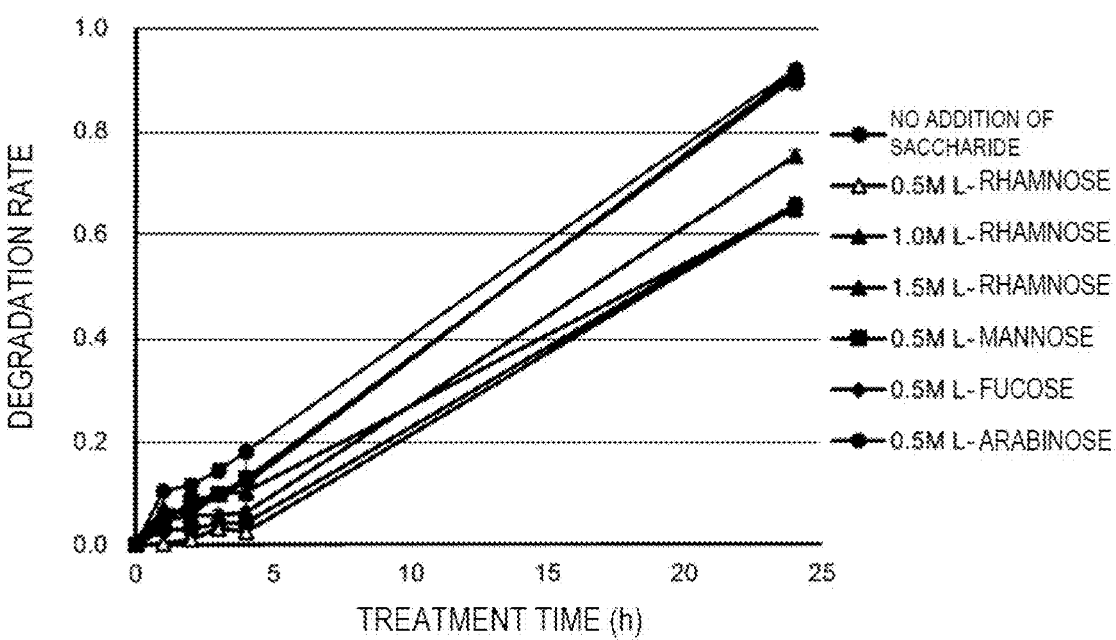

As a result, as shown in FIG. 5A, D-arabinose did not show significant promotion of degradation when lysozyme was used alone, and promoted the degradation when mutanolysin was used alone and when mutanolysin and lysozyme were used in combination. In addition, as shown in FIG. 5B, L-rhamnose, L-mannose, L-fucose, and L-arabinose, which showed degradation-promoting effect in Example 4, also showed the degradation-promoting effect when mutanolysin was used alone. Accordingly, it was suggested that each of the saccharides increased the activity of mutanolysin.

Example 6: Verification of Effect of Addition of Saccharide 2

With regard to D-arabinose and L-arabinose which showed a high rate of increase in the mutanolysin activity in Example 4, a difference in the promotion effect between the D-form and the L-form and optimum conditions when arabinose was added were examined. Specifically, the same reaction as in Example 1 was performed except that D-arabinose or L-arabinose was added at a final concentration of 0, 0.1, 0.5, 1.0, or 1.5 M and the reaction temperature was set to 37° C. or 50° C. Each reaction was performed in triplicate.

Figure 6A:
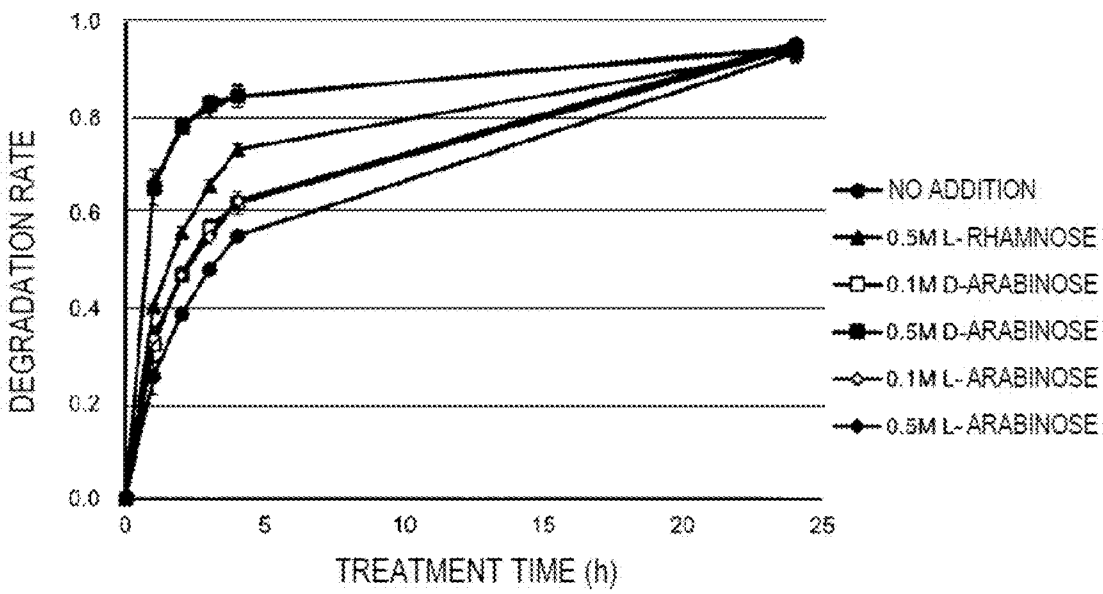
FIG. 6 is graphs showing the effect of addition of D-arabinose, L-arabinose, or L-rhamnose in cell wall degradation reaction by an N-acetylmuramidase.
Figure 6B:
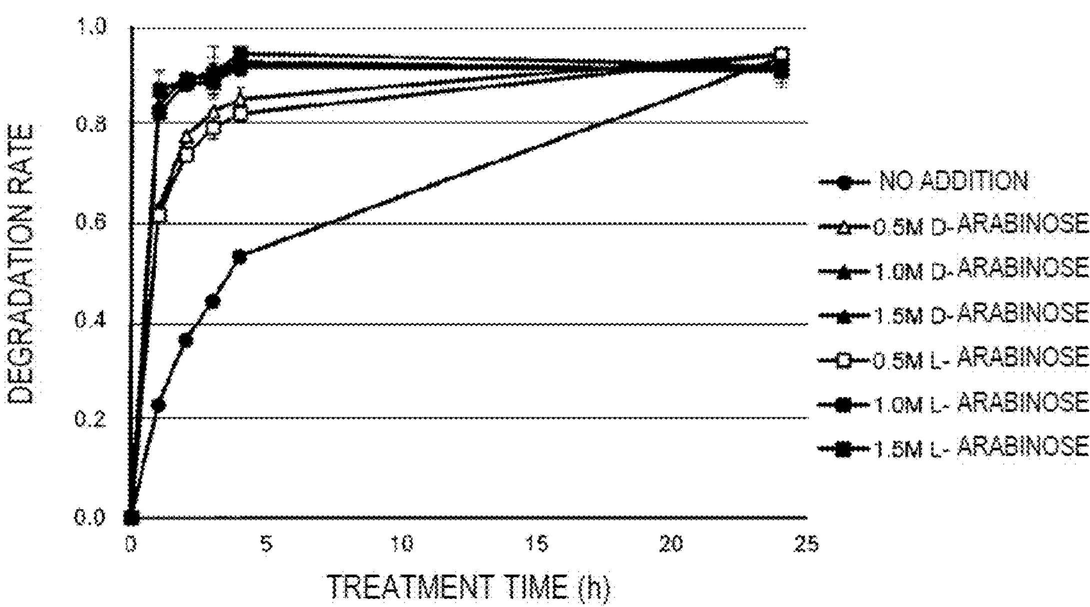
Figure 7:
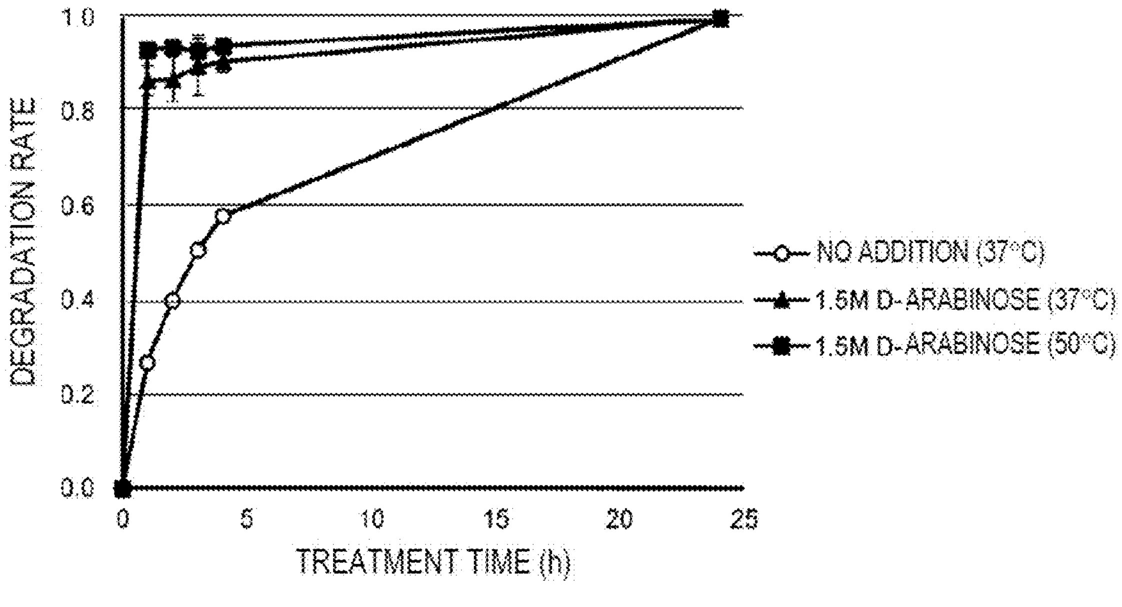
FIG. 7 is a graph showing the difference in effect caused by the difference in reaction temperature at the time of addition of D-arabinose in cell wall degradation reaction by an N-acetylmuramidase.

As a result, as shown in FIG. 6, there was no difference between the promotion effects of the D-form and the L-form within a concentration range from 0.1 M to 1.5 M. In addition, the degradation rate after 1 hour of the reaction exceeded 80° in both the case where the concentration was 1.0 M and the case where the concentration was 1.5 M and the degradation rate in the case where the concentration was 1.5 M was slightly higher than that in the case where the concentration was 1.0 M at each time, and concentration dependence was observed within a concentration range of 0.1 M and 1.0 M. Accordingly, it was inferred that 1.5 M, which is near the upper limit of the solubility in water at room temperature, is the optimum concentration. Furthermore, as shown in FIG. 7, in the reaction for a short time, the degradation rate at 50° C. was higher than that at 37° C., and when 1.5 M of D-arabinose was added, the degradation rate reached 93% after 1 hour.

The invention claimed is:

1. A method for promoting cell wall degradation, the method comprising:

preparing a bacterial suspension, adding from 1 to 1,000 U of N-acetylmuramidase and at least one saccharide to the bacterial suspension, wherein the N-acetylmuramidase consists of mutanolysin, wherein the at least one saccharide comprises at least one monosaccharide selected from the group consisting of D-lyxose, L-lyxose, D-ribose, L-ribose, L-fucose, and L-rhamnose, wherein a concentration of the at least one saccharide in the bacterial suspension is from 0.5 M to 1.5 M, and wherein the bacterium is a bacterium belonging to the genus *Lactobacillus*.

2. The method according to claim 1, comprising adding from 50 to 1,000 U of N-acetylmuramidase.

3. The method according to claim 1, wherein the at least one saccharide is D-lyxose, L-lyxose, or L-fucose.

4. The method according to claim 1, wherein the bacterium is *Lactobacillus casei*.

5. The method according to claim 1, wherein the at least one saccharide increases activity of mutanolysin and promotes cell wall degradation, as compared to glucose which decreases cell wall degradation.

* * * * *